United States Patent [19]

Kasprzyk

[11] Patent Number: 5,176,037

[45] Date of Patent: Jan. 5, 1993

[54] LINEAR ACTUATOR WITH CONTROLLABLE OUTPUT FORCE

[75] Inventor: Donald J. Kasprzyk, Maple Grove, Minn.

[73] Assignee: Honeywell Inc., Minneapolis, Minn.

[21] Appl. No.: 783,799

[22] Filed: Oct. 28, 1991

[51] Int. Cl.$^5$ .............................................. F16H 25/08
[52] U.S. Cl. ........................................ 74/53; 74/107; 251/263
[58] Field of Search ............................ 74/53, 55, 107; 251/129.19, 129.20, 251, 263

[56] References Cited

U.S. PATENT DOCUMENTS

| | | | |
|---|---|---|---|
| 343,857 | 6/1886 | Richards | 74/53 |
| 1,784,902 | 12/1930 | Maurais | 74/55 |
| 1,989,942 | 2/1935 | Parks et al. | 251/263 X |
| 2,329,820 | 9/1943 | Breese | 251/263 X |
| 2,460,695 | 2/1949 | Hennessy | 74/107 X |
| 2,970,485 | 2/1961 | Frank | 74/55 |
| 3,082,633 | 3/1963 | Rabinow | 251/129.2 X |
| 3,142,186 | 7/1964 | Melton et al. | 74/54 |
| 4,087,970 | 5/1978 | Slazas et al. | 74/54 X |

FOREIGN PATENT DOCUMENTS

| | | | |
|---|---|---|---|
| 1044585 | 11/1958 | Fed. Rep. of Germany | 74/55 |
| 915795 | 1/1963 | United Kingdom | 74/55 |

*Primary Examiner*—Richard Lorence
*Assistant Examiner*—David W. Laub
*Attorney, Agent, or Firm*—Edward Schwarz

[57] ABSTRACT

An actuator suitable for use with a valve has a design allowing for easy control or adjustment of the force applied to the valve. The actuator motor has a cam which operates a follower surface of a spring-loaded arm mounted for rotation on a carriage. The carriage is mounted for linear motion and connected to the control element of the valve. The actuation force can be controlled or adjusted by changing the relative positions of the arm's center of rotation, the point on the arm at which the spring applies force, and the position of the cam. In a preferred embodiment, the position of the arm's center of rotation is changed by moving a pin from one set of holes in the carriage and the arm to a second set of holes in the carriage and the arm.

11 Claims, 3 Drawing Sheets

LINEAR ACTUATOR WITH CONTROLLABLE OUTPUT FORCE

BACKGROUND OF THE INVENTION

The linear actuator is a common device having many different uses in a variety of fields. These actuators come in a variety of designs, depending on the application. The following discussion deals with the type having a motor with a rotatable output shaft on which is mounted a cam. The cam efficiently converts the rotary motion to linear motion.

One very common application for linear actuators of the cam-operated type is in opening and closing valves, and it is in this context that the invention will be explained. However, the reader should understand that I do not intend to limit the scope of the disclosure to valves only as the actuated devices. There are many different types of workpieces for which positioning is important, and where the invention to be described may have application.

In many of these positioning applications, it is important that the closure force be controllable or adjustable. (The term "closure force" will be used hereafter, but is meant to include the force required to open the valve as well.) By "controlling" closure force, is meant the ability to easily provide a particular value of force in an actuator. By "adjusting" closure force is meant the ability to easily change the closure force provided by a particular actuator either at the factory or in the field. When operating a valve for example, too great a force may damage the valve seat. Too little force may not close the valve securely. It is convenient to be able to generate differing closure forces from the same basic actuator design since this allows a wide range of applications with only a few different parts.

In certain prior art actuators, the practice is to use a spring to transmit the closure force, and by changing the stiffness of the spring, change the closure force. When a range of different values of closure force is required, this means that a different strength of spring is required for each closure force value. This leads to a relatively large number of different spring values to carry in the manufacturing inventory. Accordingly, it would be advantageous to use a design which eliminates the need for a number of different springs and at the same time allows for a number of different closure force values.

BRIEF DESCRIPTION OF THE INVENTION

Linear actuator apparatus to be driven by a motor having a rotating output shaft on which is mounted a cam having a camming surface, can have different closure force values without the need to change springs. In such a unit the motor is conventionally fixed to a bracket on which is mounted a device to be actuated. The actuator apparatus which converts the rotation of the cam to the needed linear force of a preselected value includes a carrier mounted for translation on the bracket. An arm having a follower surface juxtaposed to the cam's camming surface is mounted for rotation on the carrier. Resilient means, i.e., a spring, are mounted on the carrier and in contact with the arm. The resilient means create torque on the arm urging the arm's follower surface into contact with the arm. The device such as a valve to be operated by the actuator is mechanically connected to the carrier. As the cam rotates, its torque is converted into linear force applied to the camming surface of the arm. This force is transmitted by the rotational mount of the arm and by the spring to the device to be operated through the carrier. Should the force within the device to be operated and applied to the carrier exceed the preselected value, the spring or other resilient means flex, limiting force applied to the device to be actuated.

In effect, the rotational mount for the arm, the spring, and the camming surface comprise a simple lever arrangement, and by changing the relative spacings between these three points, the closure force can be controlled or adjusted. In one preferred embodiment, there are means provided to change the position of the center of rotation of the arm. It is, however, also possible to change the position of the camming surface or of the spring. In a factory, a single design can have a number of different closure forces by simply forming the holes of the rotational mount for the arm in the carrier at different spacing relative to the camming surface and the resilient means.

Accordingly, one object of the invention is to allow manufacture of linear actuators with differing closure force values from essentially identical parts.

Another object is to allow easy change of closure force for an already manufactured linear actuator.

Yet another object of the invention is to provide a closure force of a particular value for an actuator with a spring having a lesser value of compressive force.

DESCRIPTION OF THE PREFERRED EMBODIMENTS

Figure 1:
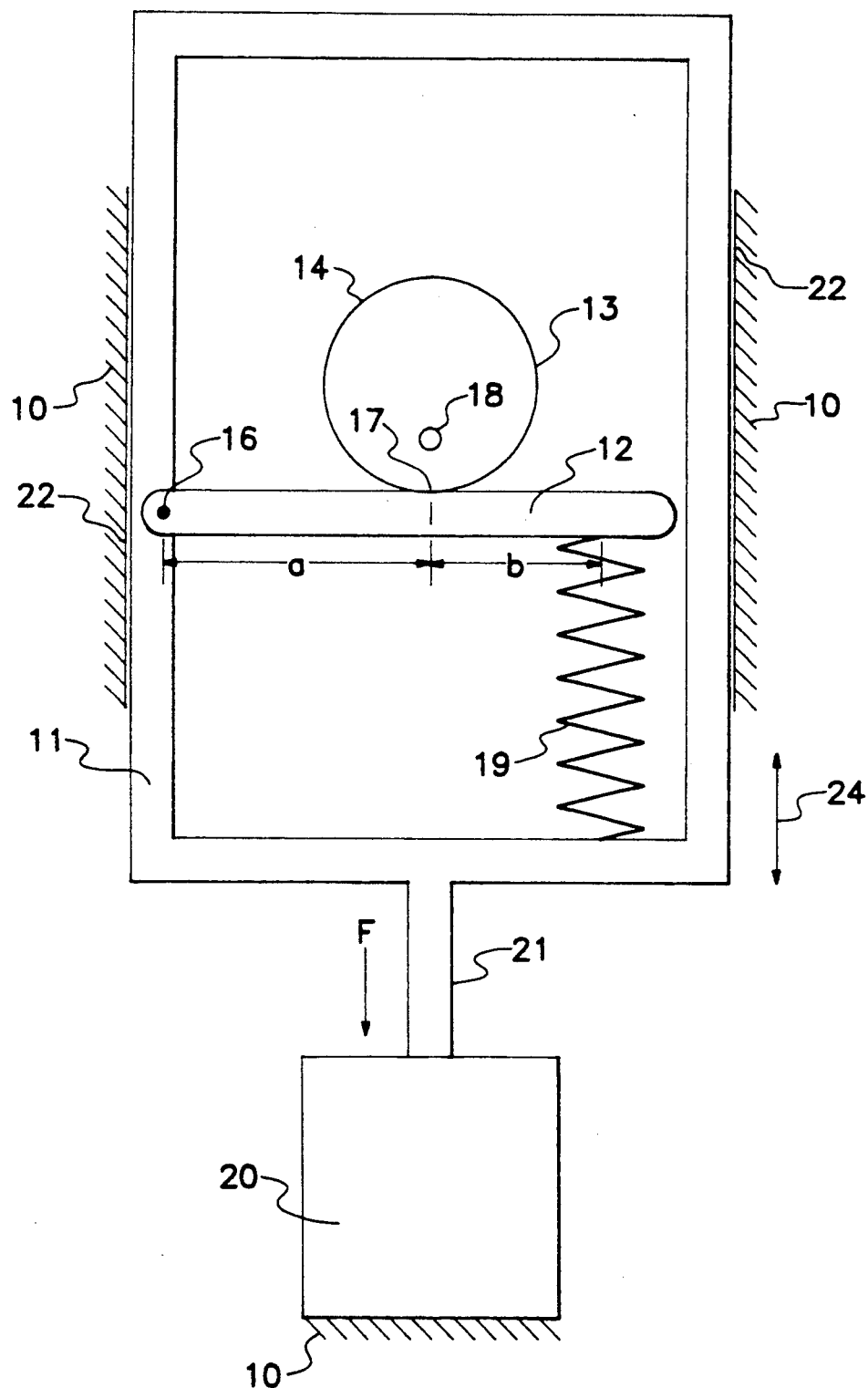
FIG. 1 is a mechanical schematic of the invention.

Turning first to FIG. 1, the mechanical schematic therein shows the essential elements and the operation of the invention. A bracket 10 is shown schematically as having mounted on it a device such as a valve to be actuated. Bracket 10 also has guides 22 in which a carrier 11 is mounted and supported for linear movement i.e., translational motion as indicated by the double-ended arrow 24. A cam 14 having a peripheral camming surface 13 is carried by a shaft 18, shaft 18 perhaps being the output shaft of a low speed rotational actuator, not shown in FIG. 1. An arm 12 is mounted for rotation on carrier 11, for example by the pin 16 which establishes a center of rotation for arm 12. Arm 12 has a cam follower surface 17 juxtaposed to the camming surface 13 of cam 14. A spring 19 is supported at one end by carrier 11 and at a location on the arm 12 spaced from the center of rotation established by the pin 16 applies force to the arm 12 creating counterclockwise torque on arm 12 urging its follower surface into contact with the camming surface 13 of cam 14.

As cam 14 rotates counterclockwise on shaft 18 as shown in FIG. 1, force is created on the follower surface 17 of arm 12 which is transmitted through pin 16 and spring 19 to carrier 11 which then drives output shaft 21 downwardly to apply the desired force to device 20. The force created by cam 14 on arm 12 also creates clockwise torque on arm 12, and should the torque created by cam 14 exceed that created by spring 19, then spring 19 will begin to deflect, limiting the force applied to device 20. In fact for a given closure force value F, the spring 19 force required can be easily determined to be approximately equal to $aF/(a+b)$, where a and b are the dimensions shown in FIG. 1, the spacings respectively of the center of pin 16 from the point of contact of the cam 14 and the follower surface 17 and of the follower surface 17 from the point of contact of the spring 19 on arm 12.

In a manufacturing operation, it is very easy to change the dimensions a and b and thereby change F without using a spring 19 having a different force. For example, by drilling or forming holes for pin 16 so as to decrease or increase a, F will change correspondingly. Typically, arm 12 and carrier 11 are stamped parts, so at the manufacturing level, the dies which form these parts may have punches which may be placed in a number of different positions before the parts are stamped to place at different locations the holes which carry pin 16. Alternatively, a number of different sets of the holes which carry pin 16 may be provided in carrier 11 and arm 12, and by simply placing pin 16 in one or another set of these holes, different values of the dimension a result.

So long as the arrangement shown in FIG. 1 is used, the force provided by spring 19 is always less than the force provided to device 20. This is desirable, since strong springs are more expensive than weak springs. Another advantage arising from this configuration is a lower profile for the overall unit. It is also possible to rearrange the respective positions of cam 14, pin 16 and spring 19, but such alternatives are more complicated and make it more difficult to centrally locate the contact point 17 relative to the guides 22, which location reduces friction between guides 22 and carrier 11. These alternative configurations may also require stronger springs.

Figure 2:
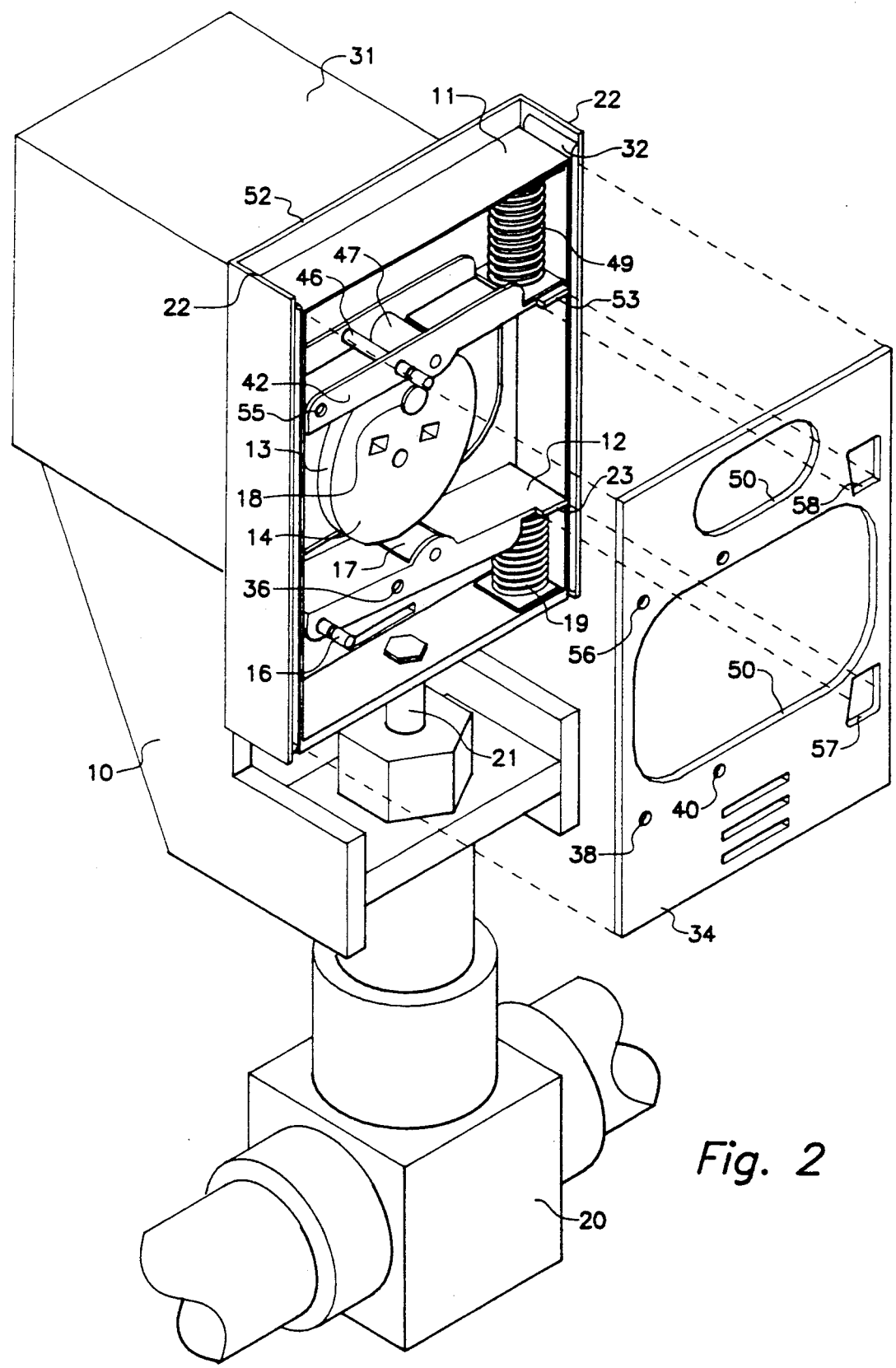
FIGS. 2 and 3 are perspective drawings of a preferred embodiment of the invention with the elements thereof in alternate positions.
Figure 3:
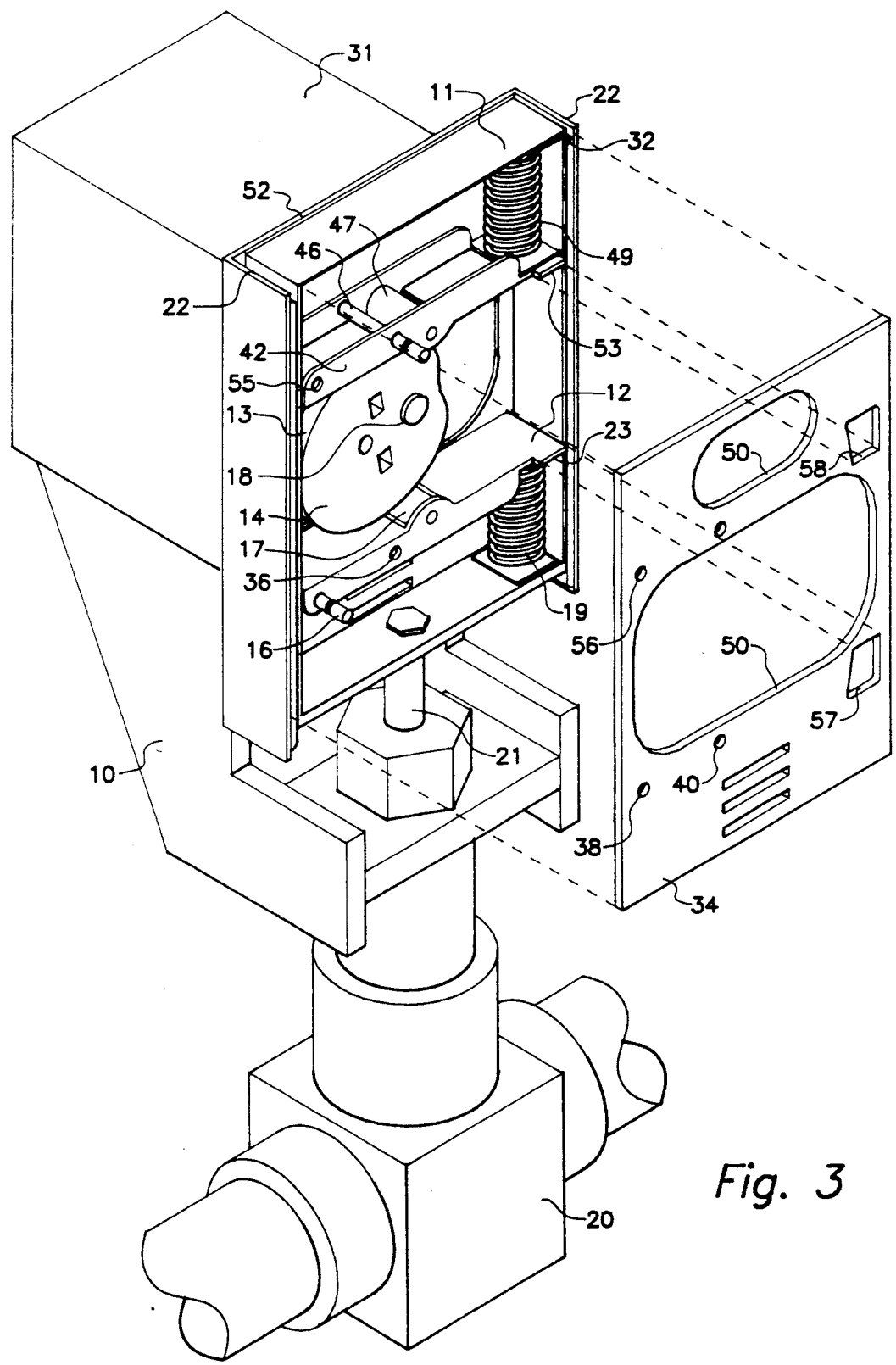

FIGS. 2 and 3 show perspective views of a preferred embodiment of this invention installed for actuating a valve comprising device 20. FIGS. 2 and 3 differ in the positions shown in them for carrier 11 and shaft 21. In FIG. 2 the shaft 21 is shown shifted into device 20. In FIG. 3, the shaft is shown part way out of device 20. The reference numbers for similar individual elements shown in FIGS. 1, 2, and 3 are the same for the reader's convenience. The actuator unit of FIGS. 2 and 3 is designed to provide adjustable force in two opposite directions.

In FIGS. 2 and 3, the carrier 11 has the arm 12 and the various cooperating elements shown in FIG. 1. In this design, a roller 17 serves as the follower surface. Carrier 11 is supported for linear motion in guides 22. Guides 22 have anti-friction bushings 32 forming the interior surfaces in which carrier 11 slides. Guides 22 of FIG. 2 are rigidly mounted on bracket 10 which also carries the drive motor 31. There is a cove plate 34 having inspection apertures 50 which fits onto the carrier 11 and moves with it. A hole (not visible) in a back plate 52 allows back plate 52 to support the far end of pin 16, with the near end of pin 16 within the hole 38 shown in cover plate 34 and supported thereby. Pin 16 passes through a hole in arm 12 which is thereby allowed to rotate on pin 16. It is also possible in this embodiment for the user to install pin 16 in holes 36 and 40 and in another hole in back plate 52 and not visible in FIGS. 2 and 3 in order to increase the force applied to shaft 21 by carrier 11. While the hole occupied by pin 16 and alternative hole 36 are the only ones shown for use by pin 16 in the apparatus of FIGS. 2 and 3, it is clear that more than two holes may be provided, and that their location can be selected for any desired actuation force required. Accordingly, a variety of actuation forces may be provided by a single design by simple changes during the stamping process by which arm 12 and front and back plates 34 and 52 are formed.

In order to provide an adjustable lifting force as well on carrier 11, a second arm 42 and associated elements are provided in FIG. 2, all of which operate in exactly the same manner as do arm 12 and its associated elements. Thus, there is provided a roller 47 serving as a follower surface for arm 42, a pivot pin 46 about which arm 42 rotates, and a spring 49 which applies force to arm 42 rotating it into contact with camming surface 13. Pivot pin 46 is shown in the high force position in arm 42, but can have its position in arm 42 also changed in order to change the force which carrier 11 applies to shaft 21 during lifting shaft 21.

In this dual arm embodiment, it is necessary to prevent force transmitted from cam 14 by one arm to carrier 11 from interfering with force from cam 14 transmitted by the other ar to carrier 11. To further this purpose, arms 12 and 42 have near their free ends, features comprising tabs 23 and 53 projecting into other features comprising apertures 57 and 58 respectively of cover plate 34 when cove plate 34 is installed on carrier 11. When springs 19 and 49 have not been compressed by force from cam 14, tabs 23 and 53 rest on the top and bottom edges of apertures 57 and 58 respectively to maintain clearance between rollers 17 and 47 to prevent them from simultaneously contacting cam 14. That is, the spacing between apertures 57 and 58 must be such that the minimum spacing between rollers 17 and 47 is at least equal to the maximum chord length of the cam 14 profile between rollers 17 and 47. When, as is shown in FIG. 2, force from cam 14 does compress one or the other of springs 19 and 49 and lift the tab 23 or 53 from the aperture edge on which it rests when the associated spring 19 or 49 is not compressed, then the size of the aperture 57 or 58 is such that tab 23 or 53 does not contact the aperture edge facing the normal rest edge for the tab involved.

The preceding description allows one to understand and practice the invention which I claim as follows:

1. Linear actuator apparatus to be driven by a motor having a rotating output shaft on which is mounted a cam having a camming surface, said motor to be fixed to a bracket for mounting on a device to be actuated, said linear actuator apparatus comprising a carrier mounted for translation on the bracket, an arm mounted for rotation on the carrier and having a follower surface juxtaposed to the cam's camming surface, and resilient means mounted on the carrier and in contact with the arm for creating torque on the arm urging the arm's follower surface into contact with the cam.

2. The apparatus of claim 1, wherein the resilient means comprises a linear action spring carried at one end on the carrier and in contact with the arm at a position spaced apart from the center of rotation of the arm.

3. The apparatus of claim 2, wherein the linear action spring is a compression spring.

4. The apparatus of claim 1, including means for varying the torque created on the arm by the resilient means.

5. The apparatus of claim 4, wherein the resilient means comprises a linear action spring carried at one end on the carrier and in contact with the arm at a position spaced apart from the center of rotation of the arm.

6. The apparatus of claim 5, wherein the torque varying means comprises means for varying the spacing of the center of rotation of the arm from the linear action spring.

7. The apparatus of claim 6, wherein the spacing means comprises an area of the arm having at least first and second holes at different distances from the contact point of the arm with the spring, an area of the carriage having first and second holes in alignment respectively with the first and second holes in the arm, and a pin for insertion in one of the pair of the arm and carriage first holes and the arm and carriage second holes.

8. The apparatus of claim 7, wherein the arm's follower surface comprises a roller mounted for rotation on the arm.

9. The apparatus of claim 6, wherein the arm's follower surface comprises a roller mounted for rotation on the arm.

10. The apparatus of claim 1, wherein the carrier includes a first feature, and the arm includes a second feature in interference with the first feature, said first and second features cooperatively limiting the angle through which the arm can rotate toward the cam.

11. The apparatus of claim 10, wherein the first feature comprises a part of the carrier having an aperture, and the second feature comprises a tab projecting into the carrier's aperture, said tab resting on an edge of the aperture and supporting the arm with the follower surface spaced from the cam when the cam is at a preselected angular position.

* * * * *